(12) United States Patent
Bottini et al.

(10) Patent No.: US 7,742,160 B2
(45) Date of Patent: Jun. 22, 2010

(54) DETERMINING ANGLE OF INCIDENCE WITH RESPECT TO WORKPIECE

(75) Inventors: Clemente Bottini, Marlboro, NY (US); Ronald D. Fiege, Hopewell Junction, NY (US); Roger M. Young, Warwick, NY (US); Shahin Zangooie, Hopewell Junction, NY (US); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/014,408

(22) Filed: Jan. 15, 2008

(65) Prior Publication Data

US 2009/0180108 A1 Jul. 16, 2009

(51) Int. Cl.
*G01B 11/26* (2006.01)
(52) U.S. Cl. ..................... 356/141.1; 356/400
(58) Field of Classification Search ............... 356/141.1, 356/141.2, 141.4, 141.5, 400; 250/559.3
See application file for complete search history.

(56) References Cited

U.S. PATENT DOCUMENTS

| | | | |
|---|---|---|---|
| 5,461,237 A | * | 10/1995 | Wakamoto et al. .......... 250/548 |
| 6,522,776 B1 | * | 2/2003 | Ehrichs ....................... 382/144 |
| 6,556,303 B1 | | 4/2003 | Rangarajan et al. |
| 6,687,002 B2 | | 2/2004 | Stehle et al. |
| 6,707,053 B2 | | 3/2004 | Togashi |
| 6,757,056 B1 | | 6/2004 | Meeks et al. |
| 2004/0227918 A1 | * | 11/2004 | Kurosawa ..................... 355/55 |
| 2007/0229791 A1 | * | 10/2007 | Inoue ........................... 355/67 |

* cited by examiner

*Primary Examiner*—Isam Alsomiri
(74) *Attorney, Agent, or Firm*—Ian MacKinnon; Hoffman Warnick LLC (57) ABSTRACT

A method, system and computer program product for determining an angle of incidence of a light beam illuminating a workpiece positioned on a stage are disclosed. A method for determining an angle of incidence of a light beam illuminating a workpiece positioned on a stage may include: positioning a calibration target on the stage with multiple different tilts; first determining an angle of incident of the light beam with respect to the calibration target with each tilt using a detector; mapping a response of the detector to a determined angle of incidence; and second determining the angle of incidence with respect to the workpiece based on a result of the mapping.

20 Claims, 7 Drawing Sheets

DETERMINING ANGLE OF INCIDENCE WITH RESPECT TO WORKPIECE

BACKGROUND OF THE DISCLOSURE

1. Technical Field

The present disclosure relates in general to a processing system, and more particularly to determining an angle of incidence with respect to a workpiece processed in the processing system.

2. Background Art

Utilization of optical metrology in semiconductor manufacturing has grown significantly over the past several years. The technology provides capabilities to conduct measurements of a wide variety of critical device parameters, including, for example, critical dimensions, depths and sidewall angles. The benefits of optical metrology include non-invasive and fast measurement capabilities with relatively low cost of ownership. The non-contact characteristic of the optical metrology is of great value as any time a contact is made to the surface of a device there is a possibility that the device could be damaged and/or contaminated. For optical metrology tools to yield measurement results that match, it is necessary that the optical metrology tools produce well defined incident light beams, and properly collect reflected light beams for analysis.

Figure 1:
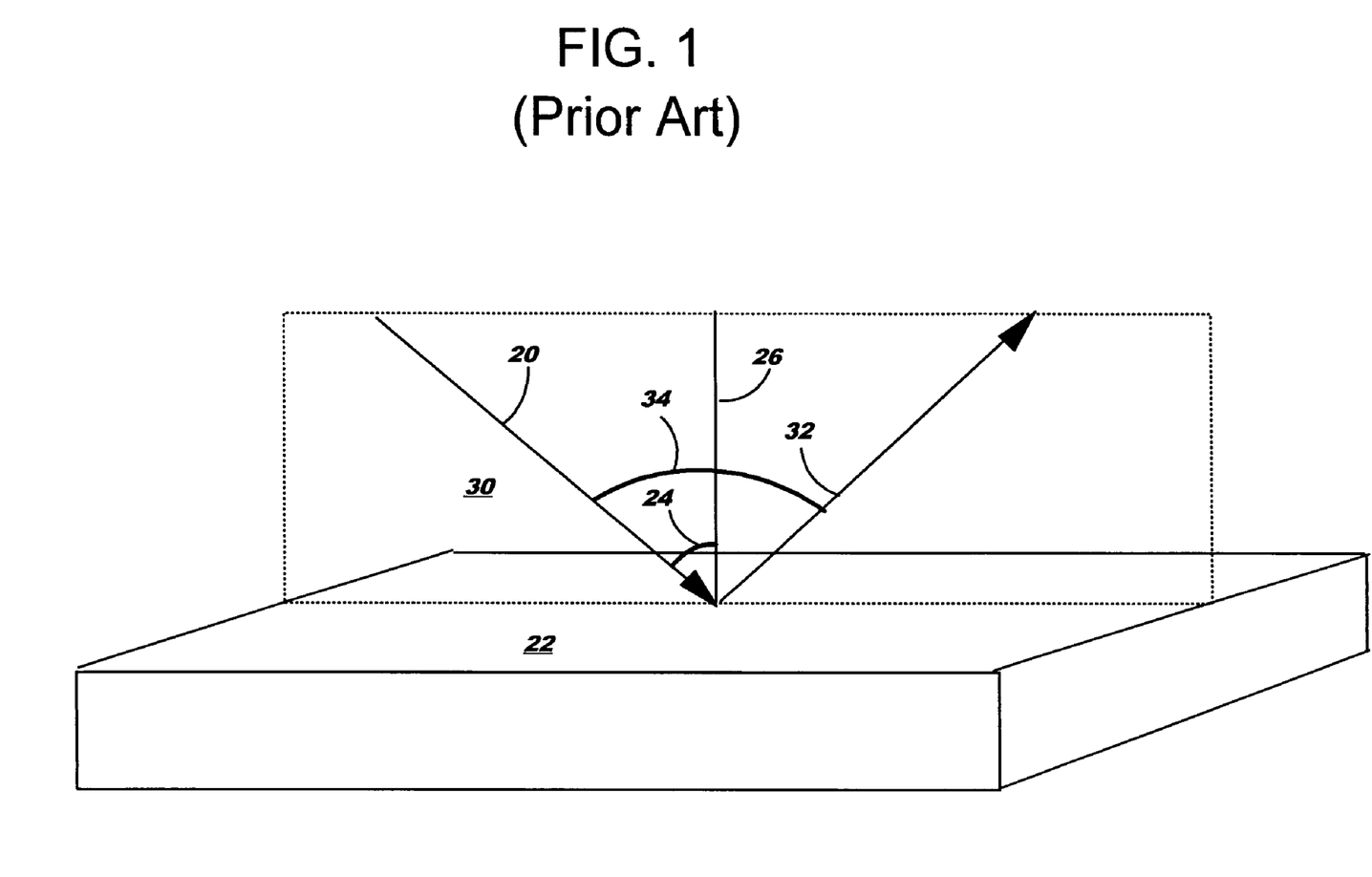
FIG. 1 illustrates a definition of an angle of incidence.

One critical parameter for an optical metrology measurement is the angle of incidence (AOI) of the light beam. FIG. 1 shows an incident light beam 20 (incident beam) that strikes a target surface 22 at an angle 24 to a surface normal 26 perpendicular to target surface 22. Angle 24 is referred to as an "angle of incidence" (AOI). A plane 30 containing incident beam 20 and a reflected beam 32 is usually referred to as a plane of incidence. By definition, angle of incidence 24 equals ½ of an angle 34 between incidence beam 20 and reflected beam 32.

While the AOI of an optical metrology tool is usually defined by the manufacturer of the optical metrology tool, the actual AOI onto a wafer being measured may vary due to issues with the optical metrology tool and/or the wafer, such as, for example, the flatness and/or orientation of a chuck used to hold the wafer, or the condition of the wafer. In the case that the actual AOI is different than the defined AOI, the resultant measurement of the optical metrology tool will contain an error. The magnitude of the error depends on, inter alia, the magnitude of the difference between the actual AOI and the defined AOI.

SUMMARY

A method, system and computer program product for determining an angle of incidence of a light beam illuminating a workpiece positioned on a stage are disclosed. A method for determining an angle of incidence of a light beam illuminating a workpiece positioned on a stage may include: positioning a calibration target on the stage with multiple different tilts; first determining an angle of incident of the light beam with respect to the calibration target with each tilt using a detector; mapping a response of the detector to a determined angle of incidence; and second determining the angle of incidence with respect to the workpiece based on a result of the mapping.

A first aspect of the disclosure is directed to a method for determining an angle of incidence of a light beam illuminating a workpiece positioned on a stage, the method comprising: positioning a calibration target on the stage with multiple different tilts; first determining an angle of incident of the light beam with respect to the calibration target with each tilt using a detector; mapping a response of the detector to a determined angle of incidence; and second determining the angle of incidence with respect to the workpiece based on a result of the mapping.

A second aspect of the disclosure is directed to a system for determining an angle of incidence of a light beam illuminating a workpiece positioned on a stage, the system comprising: means for positioning a calibration target on the stage with multiple different tilts; means for first determining an angle of incident of the light beam with respect to the calibration target with each tilt using a detector; means for mapping a response of the detector to a determined angle of incidence; and means for second determining the angle of incidence with respect to the workpiece based on a result of the mapping.

A third aspect of the disclosure is directed to a computer program product for determining an angle of incidence of a light beam illuminating a workpiece positioned on a stage, comprising computer usable program code which, when executed by a computer system, enables the computer system to: position a calibration target on the stage with multiple different tilts; first determine an angle of incident of the light beam with respect to the calibration target with each tilt using a detector; map a response of the detector to a determined angle of incidence; and second determine the angle of incidence with respect to the workpiece based on a result of the mapping.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements among the drawings.

DETAILED DESCRIPTION OF THE DISCLOSURE

With all the possible combinations of sources that contribute to AOI variations, an efficient way to address the AOI error is to determine the actual AOI for each optical metrology measurement task, i.e., determine an AOI with respect to a wafer measured by the optical metrology tool. The following detailed description of embodiments refers to the accompanying drawings, which illustrate specific embodiments of the disclosure. Other embodiments having different structures and operations do not depart from the scope of the present disclosure.

Figure 2:
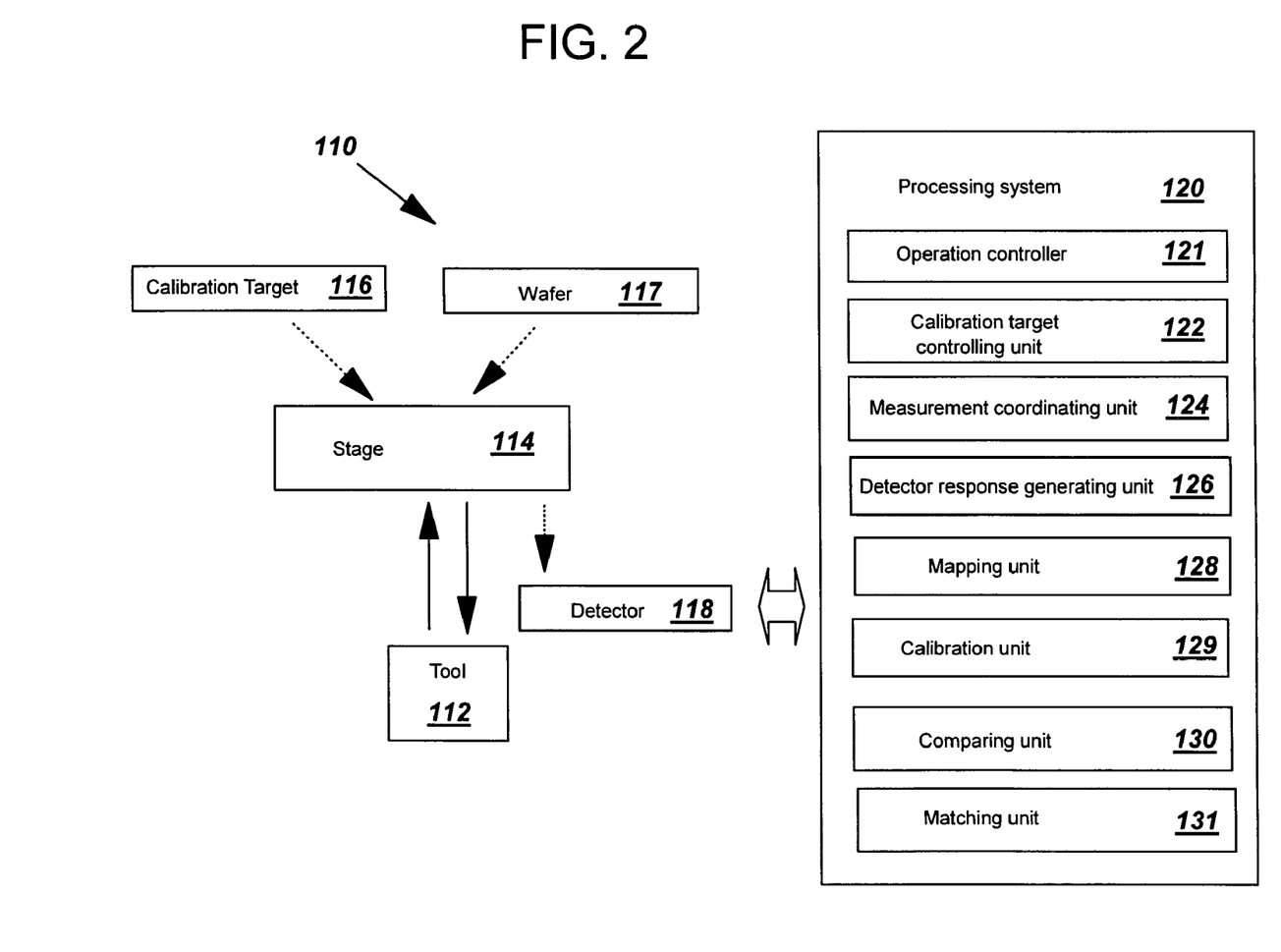
FIG. 2 shows embodiments of a system.

FIG. 2 shows a block diagram of a system 110 according to an embodiment of the disclosure. System 110 includes an optical metrology tool (tool) 112, a stage 114, a calibration target 116, a workpiece 117 (for example, a wafer), a detector 118 and a processing system 120. Processing system 120 includes an operation controller 121, a calibration target controlling unit 122, a measurement coordinating unit 124, a detector response generating unit 126, a mapping unit 128, a calibration unit 129, a comparing unit 130, and a matching unit 131.

System 110 may include multiple tools 112 used to measure the same or different wafers 117. Different tools 112 may require different detectors 118 or the same detector 118. As the AOIs of multiple tools 112 need to be determined separately, the operation of the AOI determination for only one tool 112 will be described herein for brevity purposes. For the same reason, FIG. 2 includes only one tool 112 and one detector 118 for brevity purposes. In operation, calibration target 116 will be positioned on stage 114 for calibration purposes (operation S1 in FIG. 3) and wafer 117 will be positioned on stage 114 for measuring the actual AOI of a light beam generated by tool 112 with respect to wafer 117 (operation S2 of FIG. 3), as will be described herein.

According to an embodiment, processing system 120 may be implemented by a computer system. The computer system can comprise any general purpose computing article of manufacture capable of executing computer program code installed thereon to perform the process described herein. The computer system can also comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. The operation of system 110 will be described herein in detail.

Figure 3:
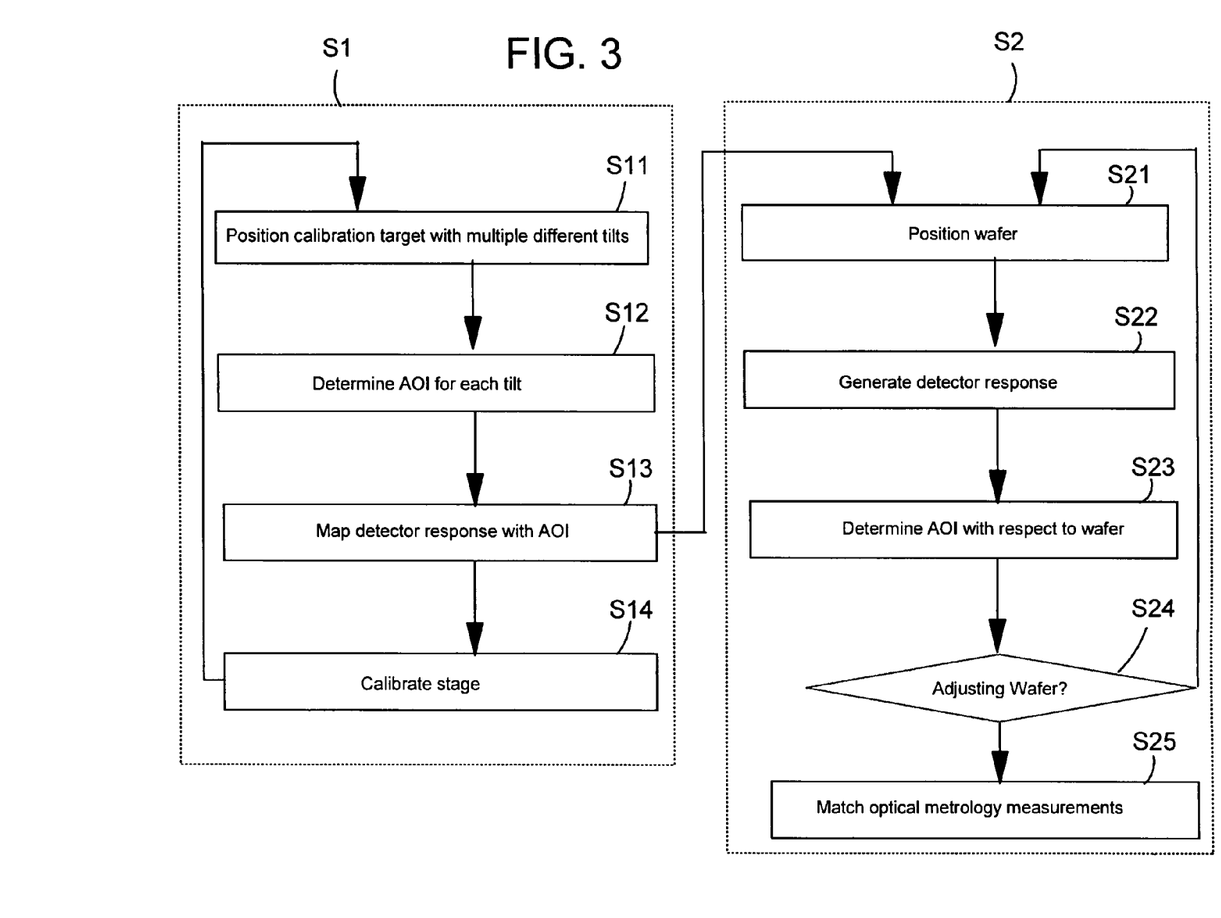
FIG. 3 shows embodiments of an operation of the system of FIG. 2.

FIG. 3 shows embodiments of an operation of system 110. Referring to FIG. 3, the operation includes a calibration operation S1 (shown on the left side) and a measurement operation S2 (shown on the right side). Calibration operation S1 and measurement operation S2 are described and illustrated separately because, among other things, a result of the calibration operation S1 may be used in multiple measurement operations S2. Operations S1 and S2 each includes multiple sub-processes.

Figure 4:
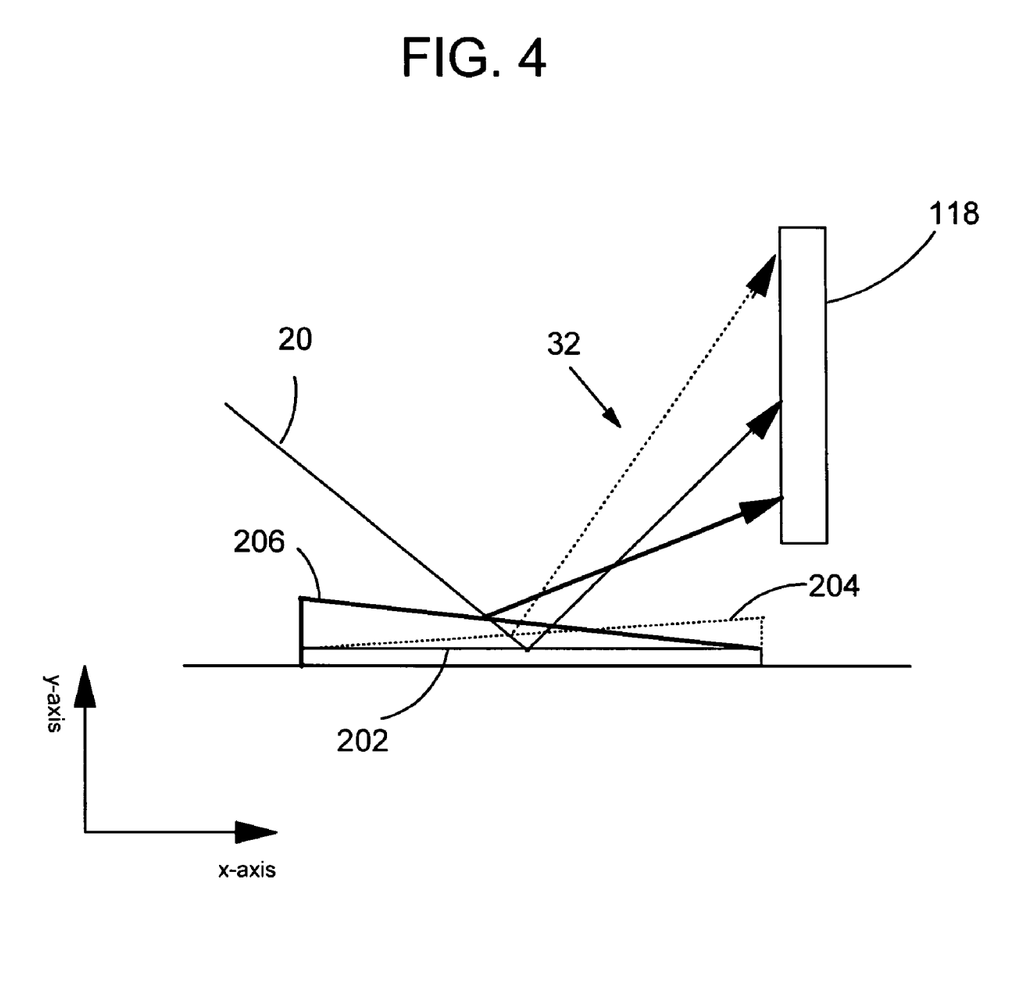
FIG. 4 shows reflected beams due to wafer tilts, and an embodiment of positioning a detector.

Referring to FIGS. 2 and 3, collectively, in S11, calibration target controlling unit 122 controls positioning of calibration target 116 on stage 114 with multiple different tilts. According to an embodiment, calibration target 116 is sufficiently flat and uniform such that a change in the measured AOI may practically be attributed completely to the tilt of target 116. Note that parameters of other components involved, e.g., stage 114 and tool 112, are treated as fixed. The term "practically" indicates that the levels of flatness and uniformity are limited to a preset accuracy standard. FIG. 4 shows an illustrative example of a schematic setup of calibration operation S1 including the tilting of calibration target 116. As shown in FIG. 4, position 202 represents that calibration target 116 (shown in thin solid lines) is positioned flatly, i.e., zero tilt. Position 204 represents calibration target 116 (shown in dotted lines) tilted with its right side higher; and position 206 represents calibration target 116 (shown in thick solid lines) tilted with its left side higher. It should be appreciated that although FIG. 4 shows the tilts of calibration target are within a single plane formed by the x and y axes, this is only a simplified illustration. In an actual implementation, calibration targets 116 may include tilts in various directions to cover the complexity of the measurement of wafer 117 of FIG. 1. According to an embodiment, a range of the tilts may need to be sufficiently wide to cover the possible tilts that may occur when wafer 117 is positioned on stage 114. The positioning of calibration targets 116 with different tilts on stage 114 may be implemented by positioning the same calibration target 116 differently (i.e., with different tilts) or may be implemented by positioning different calibration targets 116 with built-in tilts. In the description herein, calibration target 116 positioned with a tilt will be referred to as a calibration target 116 setup.

Figure 5:
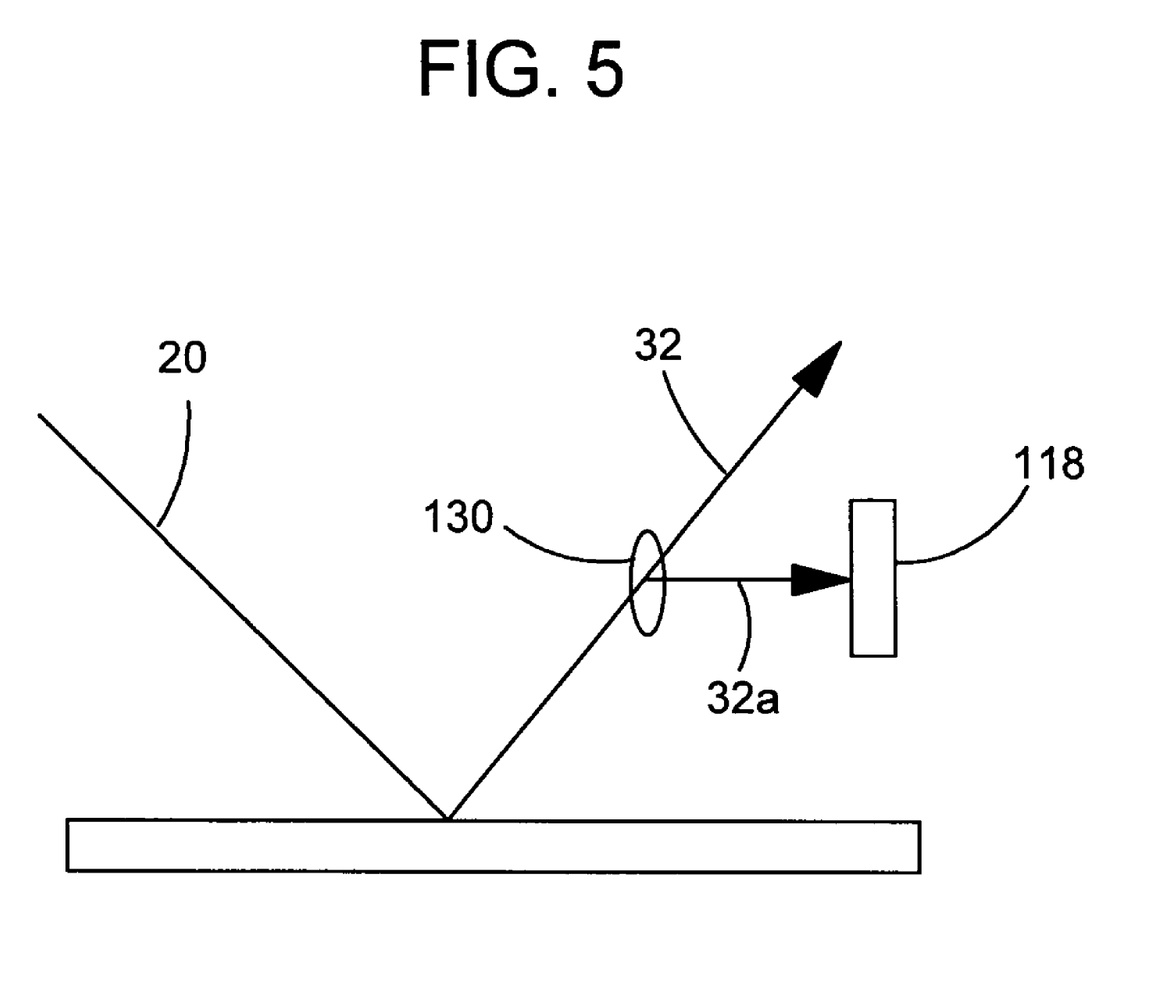
FIG. 5 shows another embodiment of positioning a detector.

In sub-process S12, measurement coordinating unit 124 coordinates with detector 118 to determine an AOI of the light beam of tool 112 with respect to calibration target 116 with each tilt. When calibration target 116 is tilted, reflected beam 32 will also change in direction as shown in FIG. 4. Detector 118 may detect/respond to the change in reflected beam 32 and measurement coordinating unit 124 may determine the AOI based on the response of detector 118 or relate the AOI (if known) with the response of detector 118. Specifically, FIGS. 4 and 5 illustrate two detector 118 setups/positions for measuring the AOIs. In FIG. 4, detector 118 is positioned substantially in line with reflected beam 32 to detect the direction thereof. In FIG. 5, detector 118 is positioned substantially in line with a split beam 32a of reflected beam 32. Split beam 32a may be generated by beam splitter 130. Detector 118 setups of FIGS. 4 and 5 may be used separately or in combination.

Figure 6:
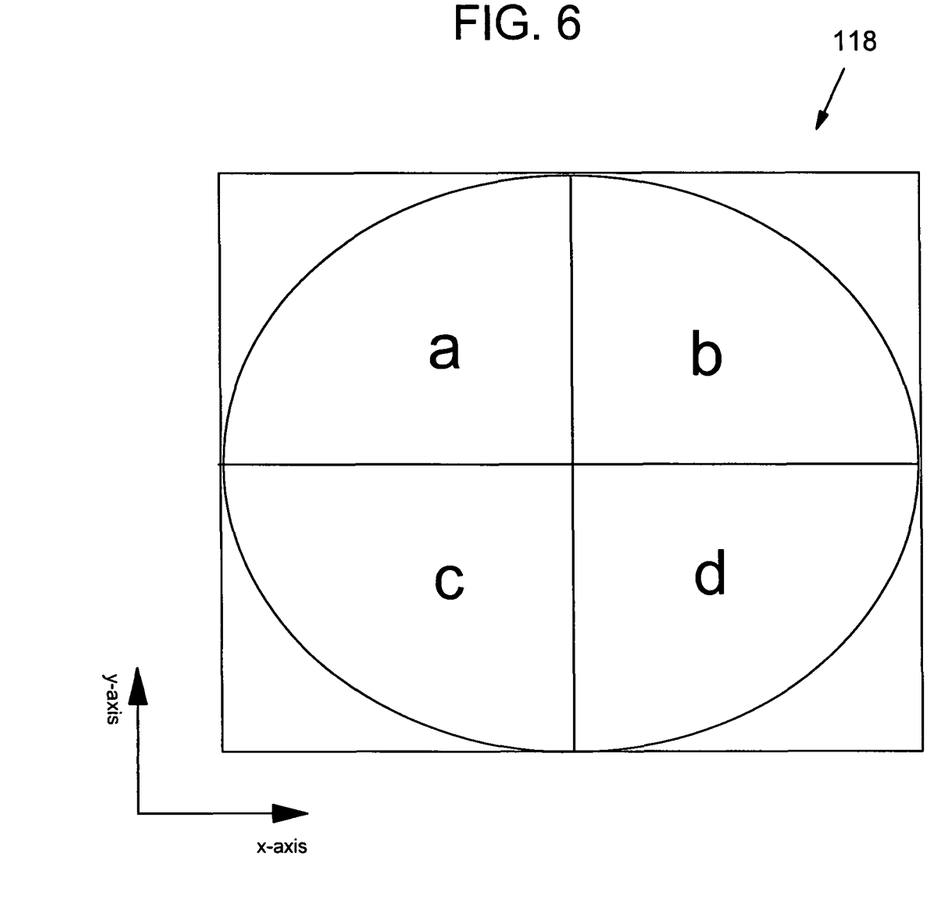
FIG. 6 shows an embodiment of a detector.
Figure 7:
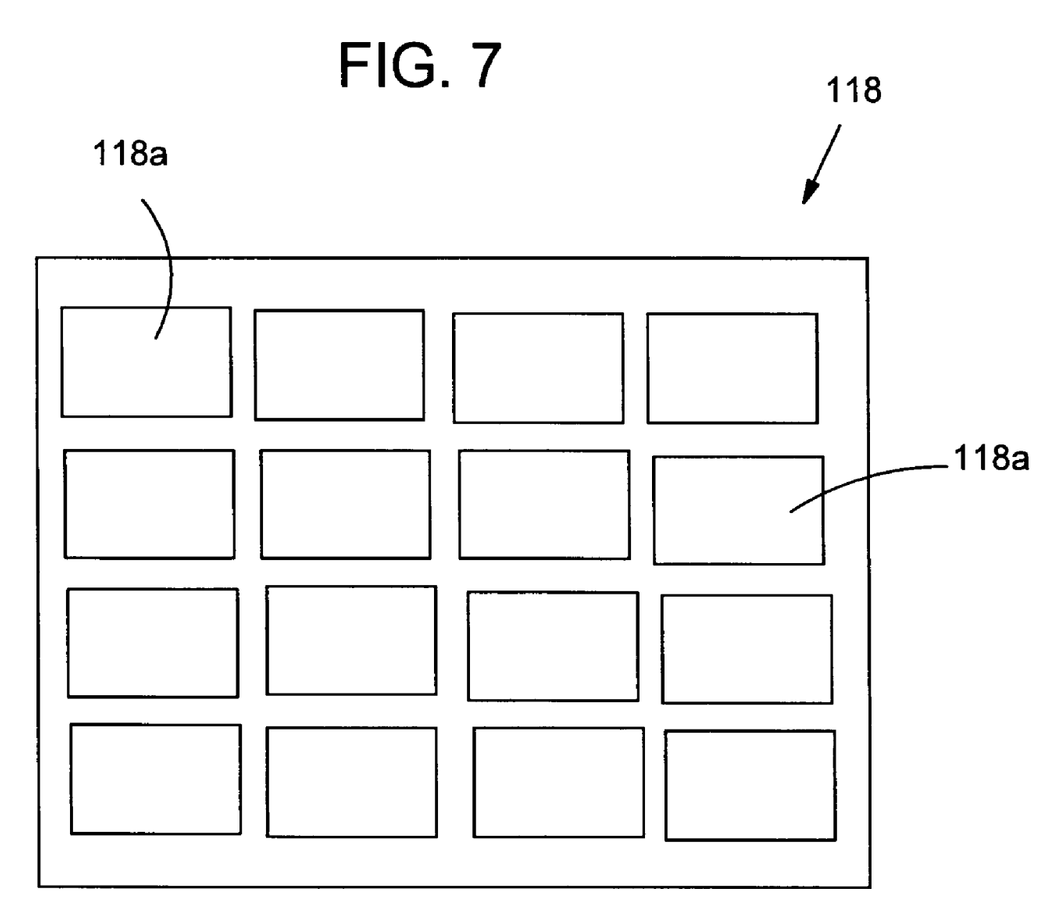
FIG. 7 shows another embodiment of a detector.

Detector 118 may include a detector of multiple independent detection areas as shown in FIG. 6, e.g., a quad cell detector with independent detection areas a, b, c, and d, and/or an array of multiple detectors 118a, as shown in FIG. 7. The term "array" may include the situation of a matrix (i.e., including rows and columns), as shown in FIG. 7, or may include only one row or one column. In the detector 118 setups of FIGS. 6 and 7, detector 118 may detect a direction of reflected beam 32/split beam 32a based on, e.g., the signal generated in each independent detection area/each detector.

Because calibration target 116 is sufficiently flat and uniform and the parameters and tilts of calibration target 116 are known, the AOI with respect to each calibration target 116 set up (i.e., tilt) may be determined. For example, if AOI of tool 112 with respect to stage 114 is known, the AOI of tool 112 with respect to a calibration target 116 setup may be determined based on the known tilt of calibration target 116. If AOI of tool 112 with respect to stage 114 is not known (due to, for example, a recent stage calibration), the AOI with respect to a calibration target 116 setup may be calculated. For example, with respect to quad cell detector 118 of FIG. 6, the AOI with respect to a calibration target 116 setup may be determined using the following equations:

$$X = (B+D) - (A+C);$$

$$Y = (A+B) - (C+D);$$

$$R = \text{Square Root } (X^2 + Y^2); \text{ and}$$

$$\text{Delta AOI} = \arcsin R/L;$$

where A, B, C, D denote signals generated in the four independent detection areas a, b, c, d of detector 118, X denotes location of reflected beam 32 in the x axis on detector 118, Y denotes location of reflected beam 32 in the y axis, factor R is calculated from X and Y, L denotes a distance between detector 118 and stage 114, and delta AOI denotes the change in AOI.

Following the same procedure, measurement coordinating unit 124 may determine AOI with each calibration target 116 setup. Further, because the tilts in each calibration target 116 setup are known, measurement coordinating unit 124 may further calibrate detector 118 using the determined AOI and the known tilts. For example, if an AOI with respect to a zero calibration target 116 tilt is determined, an AOI with respect to an anti-clockwise 40 degree tilt of calibration target 116 may be deducted based on the AOI with zero tilt. This deducted AOI may be compared with a determined AOI using detector 118 to calibrate detector 118.

Further, measurement coordinating unit 124 may determine AOI with respect to one calibration target 116 setup using detector 118 and then deduct AOIs with respect to other calibration target 116 setups. However, no matter how the AOIs with respect to calibration target 116 setups are determined, measurement coordinating unit 124 may still collect data regarding the response of detector 118 to each calibration target 116 setups.

In sub-process S13, mapping unit 128 maps a response of detector 118 in detecting a direction of reflected beam 32/split beam 32a from a calibration target 116 setup to a determined AOI with respect to the calibration target 116 setup. Any response of detector 118 may be used in the mapping, and all are included. According to an embodiment, a response of detector 118 that is more reliable and sensitive may be used in the mapping. To this end, detector response generating unit 126 may select and generate a response of detector 118 to be used in the mapping. For example, with respect to quad cell detector 118 of FIG. 6, the factor R may be used as the response of detector 118 in the mapping.

According to an embodiment, the mapping relates one-to-one the response of detector 118 and the determined AOI. According to another embodiment, the mapping may further include establishing a function between the detector 118 response and the determined AOI using the available data. As a result, calibration target 116 may only need to be positioned with limited tilts in S11 and S12 for further operations, e.g., AOI determination and reflected light beam 32 direction detection, to save operation resources.

In sub-process S14, optionally, calibration unit 129 may calibrate stage 114 based on the AOIs with respect to calibration target 16. For example, after stage 114 is maintained, sub-processes S11-S12 may be operated to obtain the AOIs with respect to calibration target 116 with tilts. If the newly obtained AOIs with the known calibration target 116 tilts are different than previously obtained AOIs with the same calibration target 116 tilts before the recent stage maintenance, calibration unit 129 may attribute the AOI differences to the maintenance and may adjust stage 114 based on the AOIs (difference in AOIs). After the calibration, operation controller 121 may control operation S1 to proceed to S11.

For operation S2, in sub-process S21, wafer 117 is positioned on stage 114 in an actual operation condition. That is, wafer is positioned on stage 114 to be measured by tool 112. The measurement of wafer 17 by tool 112, e.g., with respect to critical dimensions thereof, may be conducted at the same time, earlier, or later than operation S2. Consequently, the result of operation S2 may be fed forward or fed back to the optical metrology measurement, as will be described herein.

In sub-process S22, measurement coordinating unit 124 coordinates with detector 118 to detect a reflected beam 32/split beam 32a from wafer 117 and generate a detector 118 response. That is, the response is generated in response to reflected beam 32 (directly through beam 32 or indirectly through beam 32a) from wafer 117.

In sub-process S23, comparing unit 130 determines AOI with respect to wafer 17 based on the result of the mapping of S13. Specifically, comparing unit 130 compares the response of detector 118 in response to reflected beam 32 from wafer 117 to the mapped response generated in S13 to obtain the corresponding AOI. For the one-to-one relation mapping, comparing unit 130 may need to find the exact same mapped response. For the function mapping, comparing unit 130 may input the response to the function to obtain the respective AOI.

In sub-process S24, optionally, operation controller 121 may determine whether wafer 117 needs to be adjusted. Specifically, if the determined AOI diverge from the define/allowed AOI, wafer 117 may need to be adjusted as wafer 117 may have been positioned incorrectly which causes undue tilt. If "yes", operation S2 proceeds to sub-process S21 and calibration unit 129 may adjust wafer 117, e.g., the positioning thereof, based on the determined AOI. After the adjusting, operation S2 restarts. If "no", operation S2 may proceed to S25.

In S25, matching unit 131 matches multiple optical measurements of wafer 117, made by the same tool 112 or by different tools 112, based on the AOI used in making each of the measurements. As mentioned above, the determined AOI may be fed forward, i.e., the AOI be considered in making the measurement, or may be fed back, i.e., the determined AOI be used in weighting/calculating the measurement results.

While shown and described herein as a method and system for determining an angle of incidence of a light beam illuminating a wafer positioned on a stage, it is understood that the disclosure further provides various alternative embodiments. For example, in an embodiment, the disclosure provides a program product stored on a computer-readable medium, which when executed, enables a computer infrastructure to determine an angle of incidence of a light beam illuminating a wafer positioned on a stage. To this extent, the computer-readable medium includes program code, which may be installed to a computer system, e.g., processing system 120 (FIG. 2), to implement the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as a memory and/or a storage system and/or as a data signal traveling over a network (e.g., during a wired/wireless electronic distribution of the program product).

It should be appreciated that the teachings of the present disclosure could be offered as a business method on a subscription or fee basis. For example, a system 110 (FIG. 2) including processing system 120 and a calibration target 116 could be created, maintained and/or deployed by a service provider that offers the functions described herein for customers. That is, a service provider could offer to determine an angle of incidence of a light beam illuminating a wafer positioned on a stage as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. A method for determining an angle of incidence of a light beam illuminating a workpiece positioned on a stage, the method comprising:
   positioning a calibration target on the stage with multiple different tilts;
   first determining an angle of incident of the light beam with respect to the calibration target with each tilt using a detector;
   mapping a response of the detector to a determined angle of incidence; and
   second determining the angle of incidence with respect to the workpiece based on a result of the mapping.

2. The method of claim 1, wherein the detector is positioned to detect at least one of a reflected beam and a split beam of the reflected beam.

3. The method of claim 1, wherein the detector includes at least one of a detector of multiple independent detection areas and an array of multiple detectors.

4. The method of claim 1, wherein the mapping includes establishing a function between the response of the detector and the determined angle of incidence with respect to the calibration target.

5. The method of claim 1, wherein the second determining includes comparing a response of the detector in response to a reflected beam from the workpiece to the mapped response.

6. The method of claim 1, further comprising adjusting the workpiece based on the determined angle of incidence thereof.

7. The method of claim 1, further comprising matching multiple optical metrology measurements of the workpiece based on an angle of incidence used in making each of the multiple measurements.

8. The method of claim 1, further comprising calibrating the stage based on the determined angle of incidence with respect to the calibration target.

9. A system for determining an angle of incidence of a light beam illuminating a workpiece positioned on a stage, the system comprising:
   means for positioning a calibration target on the stage with multiple different tilts;
   means for first determining an angle of incident of the light beam with respect to the calibration target with each tilt using a detector;
   means for mapping a response of the detector to a determined angle of incidence; and
   means for second determining the angle of incidence with respect to the workpiece based on a result of the mapping.

10. The system of claim 9, wherein the detector is positioned to detect at least one of a reflected beam and a split beam of the reflected beam.

11. The system of claim 9, wherein the detector includes at least one of a detector of multiple independent detection areas and an array of multiple detectors.

12. The system of claim 9, wherein the mapping means further establishes a function between the response of the detector and the determined angle of incidence with respect to the calibration target.

13. The system of claim 9, wherein the second determining means compares a response of the detector in response to a reflected beam from the workpiece to the mapped response.

14. The system of claim 9, further comprising means for adjusting the workpiece based on the determined angle of incidence thereof.

15. The system of claim 9, further comprising means for matching multiple optical metrology measurements of the workpiece based on an angle of incidence used in making each of the multiple measurements.

16. The system of claim 9, further comprising means for calibrating the stage based on the determined angle of incidence with respect to the calibration target.

17. A computer program product for determining an angle of incidence of a light beam illuminating a workpiece positioned on a stage, comprising computer usable program code which, when executed by a computer system, enables the computer system to:
   position a calibration target on the stage with multiple different tilts;
   first determine an angle of incident of the light beam with respect to the calibration target with each tilt using a detector;
   map a response of the detector to a determined angle of incidence; and second determine the angle of incidence with respect to the workpiece based on a result of the mapping.

18. The program product of claim 17, wherein in the second determining, the program code is configured to enable the computer system to compare a response of the detector in response to a reflected beam from the workpiece to the mapped response.

19. The program product of claim 17, wherein the program code is configured to enable the computer system to match multiple optical metrology measurements of the workpiece based on an angle of incidence used in making each of the multiple measurements.

20. The program product of claim 17, wherein the program code is further configured to enable the computer system to calibrate the stage based on the determined angle of incidence with respect to the calibration target.

* * * * *